United States Patent [19]

Erdmann

[11] 4,142,105
[45] Feb. 27, 1979

[54] METHOD FOR PRODUCING A SWITCHING SIGNAL ON THE PASSAGE OF A CONTRAST JUMP

[75] Inventor: Jürgen Erdmann, Waldkirch-Buchholz, Fed. Rep. of Germany

[73] Assignee: Erwin Sick Gesellschaft mit beschrankter Haftung Optik-Elektronik, Fed. Rep. of Germany

[21] Appl. No.: 807,712

[22] Filed: Jun. 16, 1977

[30] Foreign Application Priority Data

Aug. 17, 1976 [DE] Fed. Rep. of Germany ....... 2636906

[51] Int. Cl.² .................................................. G01N 21/30
[52] U.S. Cl. .................................... 250/548; 250/560; 250/561; 250/209
[58] Field of Search ............... 250/214 R, 560, 548, 250/561, 202, 203, 209

[56] References Cited

U.S. PATENT DOCUMENTS

| 3,710,128 | 1/1973 | Kubisiak | 250/560 |
| 3,777,167 | 12/1973 | Shepherd | 250/560 |
| 3,907,439 | 9/1975 | Zanoni | 250/560 |
| 4,025,796 | 5/1977 | Erdmann | 250/548 |

Primary Examiner—M. Tokar
Attorney, Agent, or Firm—Townsend and Townsend

[57] ABSTRACT

A photoelectric detection system which has two sequential photoelectric receivers to determine the precise moment at which the boundary between two contrasting fields passes beneath the detectors irrespective of the relative contrast between the two fields. The signals from the two photoelectric detectors which change as the boundary progressively obscures their respective fields of view are firstly subtracted to produce a difference signal. The difference signal is then passed to a gated maximum value store which is operative during each difference pulse to store the maximum value of the difference occurring during that pulse. A fraction of this maximum value is then taken and compared with the instantaneous value of the difference as this value reduces, when these two values are equal an output pulse is generated and this output pulse always occurs at the same position of the boundary relative to the photoelectric receivers irrespective of the respective levels of contrast on either side of the boundary. In a modification especially useful for detecting the two boundaries of a register mark two sequential pulses are formed indicative of the movement of the two respective boundaries past the photoelectric receivers.

19 Claims, 6 Drawing Figures

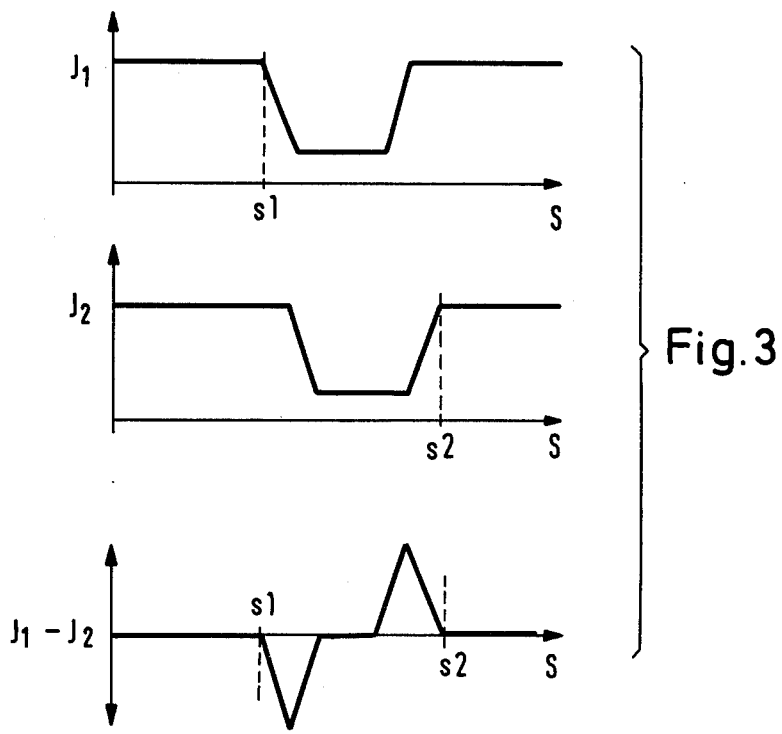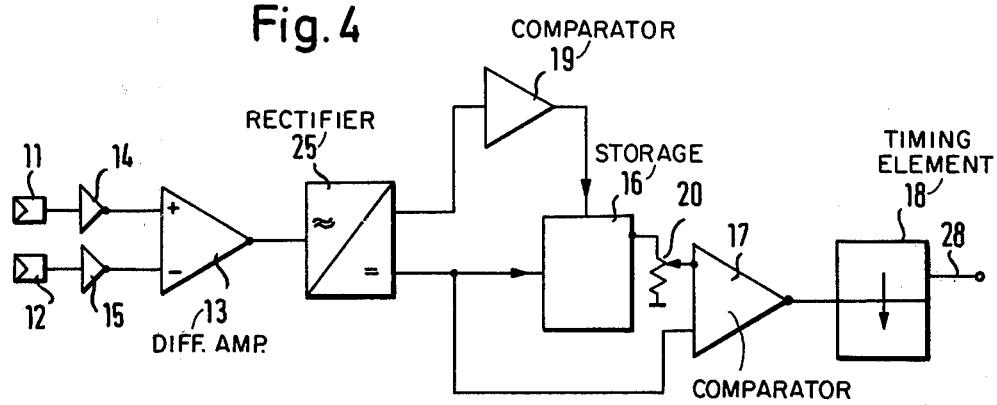

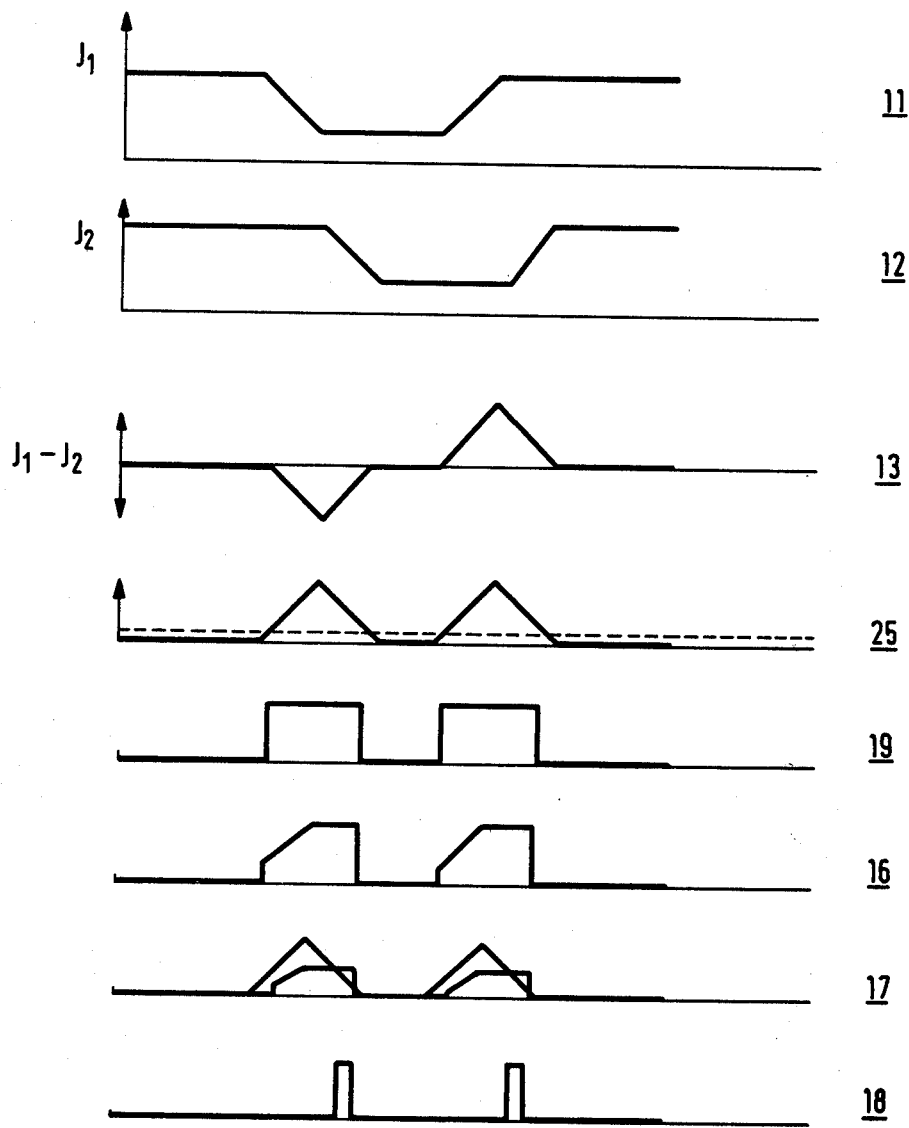

METHOD FOR PRODUCING A SWITCHING SIGNAL ON THE PASSAGE OF A CONTRAST JUMP

BACKGROUND OF THE INVENTION

The invention relates to a method for producing a switching signal on the passage of a contrast jump between two fields having a contrast movable relative to a photoelectric receiving arrangement having at least two adjacent photodetectors through a predetermined point with reference to the receiving arrangement, whereby the outputs of the photodetector are combined to form the switching signal.

For the control or regulation of the automatic operating sequence various production processes, particularly in the paper-processing industry require optically functioning scanners to detect printed colour marks. In this connection, the printed colour mark is moved at a corresponding speed through the visual range of the mark scanner and a signal is emitted via optical sensors. As the quality of the products produced, e.g. in the case of multicolour printing, is inter alia dependent on the precise local detection of the printing mark, the maximum divergence of the switching point location of the mark scanner must be less than 0.005mm from a fixed reference location. No displacement in the switching point location must be caused by colour changes in the printing mark and reflectance changes of the mark carrier. Wherever possible, there should be no adjusting device for the optimum adaptations to the particular contrast conditions which exist between background and printing mark.

In known mark scanners, optical means focus the light of a filament lamp and project onto the material surface to be scanned. Part of the light reflected by the material surface is passed via further optical means to a photodetector and is converted into an electrical quantity. If the electrical quantity exceeds or drops below a predetermined switching threshold, a switching signal is emitted, whose appearance is a measure of the switching point location.

However, this known method has the disadvantage that firstly the switching threshold must be adapted to the particular contrast difference, because e.g. a strongly reflecting mark carrier gives rise to a larger signal than the switching threshold and the weakly reflecting printing mark gives rise to a signal which is smaller than the switching threshold, the opposite being the case when using bright marks on a dark background. Secondly, due to the finite extension of the scanning light beam when the printing mark enters a constantly rising or falling luminous flux change is obtained which at a specific value exceeds or drops below the switching threshold.

In the case of changes to the reflection factor of the printing mark or mark carrier and in the case of changes to the transmitting light flux rising above or dropping below the switching threshold take place at different penetration stages of the mark into the scanning light beam, so that correspondingly different switching point locations are obtained, which is undesirable.

In a further known method (published German Patent Application No. 2,152,732), three juxtaposed photodetectors are used on which is produced a photographic image of the illuminated printing mark. Evaluation takes place in such a way that a switching signal is emitted when a differential signal occurs between the first and third photodetectors and the sum of the photoelectric current of the first and third elements has half the value of the photoelectric current of the second photodetector. This is the case when the image edge of the printing mark is precisely in the centre of the second element. Thus, the first photodetector sees the mark carrier and the second photodetector the printing mark.

Although this known method provides the necessary precision, makes unnecessary an adjusting device for adapting to the particular contrast difference and supplies the necessary two pulses on entering and leaving the mark image edge, due to the printing mark widths and the limits imposed by the dimensions of the scanning head used in this method, it is not always possible to project onto the triple photodetector group the necessary image size by means of the imaging lens. Thus, the geometrical value of the triple photodetector group must be adapted to the image. In practice, it has been found that corresponding triple photodetector combinations can seldom be provided true to size with other requisite data.

BRIEF SUMMARY OF THE INVENTION

The problem of the invention is therefore to provide a method of the type indicated hereinbefore which, by using simpler means and standard commercially available components ensures the same high precision when fixing the switching point location as the known methods described hereinbefore.

According to the invention, this problem is solved in that the difference between the signals is formed by two photodetectors positioned in series in the direction of movement and the maximum value thereof is established, a fraction of this maximum value is compared with the instantaneous value of the difference and the switching signal is emitted at the moment when this instantaneous value is equal to the fraction. The fraction is advantageously between 30 and 70% and preferably 50%. Through performing the method in this way, it is possible to use commercial differential photodetector elements, which are available in any desired size, whereby in addition they can be brought to any desired geometrical configuration by means of a stop without the spacing between the two photodetectors being changed. Thus, in the method according to the invention, the switching signal is emitted when the image edge has penetrated the second or following photodetector by the desired fraction of the difference maximum value. No matter what the reflection characteristics of the printing mark and mark carrier, the signal is always emitted at the same penetration of the image edge into the following element because for any printing mark or contrast difference, the contrast is measured and the switching threshold is correspondingly individually adjusted prior to the actual signal emission.

Preferably, the switching signal is only formed when the maximum value of the difference exceeds a predetermined threshold. This effectively suppresses small differential signals which are generally emitted by the paper structure and which could impair the measurement. Thus, the value of the predetermined threshold is fixed whilst taking account of the structure of the mark carrier or substrate.

The switching signal can be maintained for a predetermined time by suitable means, e.g. a timing element in order to reliably initiate or maintain the processes to be controlled by the switching signal. The duration of the switching signal is unimportant for the precision of the measurement.

The invention also relates to a switching arrangement for performing the method according to the invention with two photodetectors arranged in series in the direction of movement and an optical system which images the illuminated fields on the photodetectors.

A further object of the invention is to provide a signal arrangement, which can be equipped with commercially available components, having a high precision on emitting a switching signal at a particular location. By means of the switching arrangement according to the invention, it must be possible to obtain a switching signal within a deviation range of ±0.005mm, independently of changes to the contrast and reflectance.

Accordingly, in the switching arrangement according to the invention a maximum value store and parallel thereto a comparator are connected to the two photodetectors via a differential amplifier, whereby to the other input thereof is supplied a fraction of the signal stored in the maximum value store. The desired switching signal appears at the comparator output. The maximum of the photoelectric current difference thereby corresponds to the particular contrast difference in the maximum value store. On comparing the percentage fraction of the stored maximum value or the contrast difference present with the instantaneous value of the difference a signal is emitted at the comparator when the two values are identical. This is the case when the image edge penetrates the second photodetector by the percentage fraction of the difference maximum value which serves as the reference quantity. Thus, during each measurement, the switching arrangement according to the invention forms a reference signal determined by the contrast difference, so that the formation of the switching signal always takes place at the same point. Advantageously, the two photodetectors are realised by a difference photoelectric cell available with numerous desired characteristics and dimensions.

According to a preferred embodiment of the invention, the timing element which determines the duration of the switching signal is connected to the comparator. The leading edge of the output signal at the timing element precisely corresponds to the switching time and is decisive for further signal processing. The pulse duration of the output signal is determined by the timing element, but is unimportant from the precision standpoint.

It is particularly advantageous if the maximum value store has a control input which is connected to the differential amplifier via a comparator which determines the response threshold. Thus, for the activation of the maximum value store, the contrast difference is firstly compared with a fixed set value. On exceeding this threshold value, the maximum value store receives the command to store the following maximum value. As only an actually stored maximum value is the prerequisite for the emission of a switching signal, no account is taken of all the differences which do not exceed the fixed threshold. This suppresses spurious signals which can be caused by paper structures emitting small differential signals. As a result, it is ensured that switching signals only occur when contrasts appear between the mark carrier and a substrate.

The fraction of the difference maximum value is advantageously formed on a voltage divider provided at the output of the maximum value store.

While the method and apparatus according to the invention can be used in a general manner for the precise determination of a contrast jump at a particular location, they are preferably used where it is a question of establishing the start and finish of a mark located on a substrate. This problem exists in the paper-processing industry with printing marks located on the paper, whereby an electrical pulse must appear when the printing mark enters or leaves the visual area of the scanner. According to the invention, the extension of the mark in the direction of movement is larger than the extension of the two photodetectors in this direction or the extension of the two photodetectors is made correspondingly smaller than the extension of the printing mark on the substrate.

As the sign of the difference can be positive or negative depending on the lighting state, whilst however a signal with only a positive or only a negative value can be processed much more easily according to a preferred embodiment a rectifier is connected between the differential amplifier and the following components.

Preferably, current - voltage transformers are connected between the photodetectors and the differential amplifiers in order to permit an easy further processing in commercially available electronic components by providing appropriate voltages.

BRIEF DESCRIPTION OF THE DRAWINGS

Other and further objects of the present invention will be apparent from the following description and claims and are illustrated in the accompanying drawings, wherein show:

FIG. 3 three diagrams showing the photoelectric currents of the first and second photodetectors or the difference of the photoelectric currents of the first and second photodetectors as a function of the path taken by the printing mark in the direction of arrow f.

FIG. 4 a preferred switching arrangement according to the invention in a block circuit diagram.

FIG. 5 pulse diagrams at the output of the various electronic components of the switching arrangement of FIG. 4.

DETAILED DESCRIPTION OF THE PREFERRED EMBODIMENTS

Figure 1:
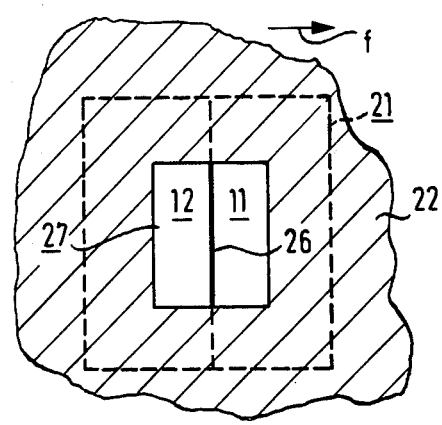
FIG. 1 a plan view of a photoelectric cell usable according to the invention with a stop positioned in front of it.

FIG. 1 shows a difference photoelectric cell 21, comprising two photodetectors 11, 12 adjoining at a dividing line 26. The preferably straight dividing line 26 generally extends perpendicular to the direction of movement f of the printing mark not shown in FIG. 1 or the not shown contrast jump on a substrate. By arranging a suitable stop 22, a desired, for example square area 27 can be masked out of the difference photoelectric cell 21.

Figure 2:
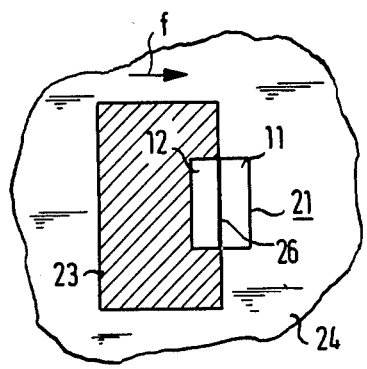
FIG. 2 a plan view of a substrate provided with a printing mark, whereby in addition, the differential photoelectric cell is diagrammatically shown in the area on which it is imaged.

According to FIG. 2, a portion of a substrate 24 carrying a printing mark 23 is imaged on the difference photoelectric cell 21. Substrate 24 moves relative to the fixed difference photoelectric cell 21 in the direction of arrow f, i.e. perpendicular to the dividing line 26 between the two photodetectors 11, 12. At right angles to the direction of movement f, printing mark 23 projects on all sides beyond photodetectors 11, 12. In the direction of movement, mark 23 has a somewhat larger extent than photoelectric cell 21.

It is now assumed that the portion visible in FIG. 2 is moved in the direction of arrow f over photoelectric cell 21. The first diagram in FIG. 3 shows the current path at the output of photodetector 11 when there is a dark mark 23 on a bright background 24. The second diagram shows the output current of photodetector 12. The difference between the two output photoelectric currents is shown in FIG. 3. Points s1 and s2 correspond to the entry or exit of mark 23 into or out of difference photoelectric cell 21. The peaks in the third diagram correspond to the passage of the contrast jump through the dividing line 26 between photodetectors 11, 12.

According to FIG. 4, the output signals of photodetectors 11, 12 are applied to a differential amplifier 13 via in each case one current - voltage transformer 14, 15. The outputs of the two photodetectors 11 and 12 and differential amplifier 13 are shown in the first three diagrams of FIG. 5, which correspond to those of FIG. 3.

A rectifier 25, which rectifies the signals according to the fourth diagram of FIG. 5, follows differential amplifier 13.

The rectifier signal is firstly applied to a maximum value store 16 and then to one input of a comparator 17, whose other input is located via a voltage divider 20 at the output of the maximum value store 16. In addition, the output of rectifier 25 is supplied via a further comparator 19 to a control input of the maximum value store 16. A timing element 18, whose output 28 supplies the desired switching signal, is connected to the output of comparator 17.

Comparator 19 has a fixed switching threshold and values the rectified signals from rectifier 25 according to diagram 19 in FIG. 5. Thus, the maximum value store 16 is controlled in such a way that it supplies an output voltage in accordance with diagram 16 in FIG. 5. By means of voltage divider 20, this output signal is reduced by a specific fraction, e.g. 50% and is compared with the differential signal of diagram 25 in FIG. 5 in the comparator 17. This comparison is shown by diagram 17 in FIG. 5. The dotted line in diagram 25 of FIG. 5 represents the switching threshold of the comparator 19. As soon as the output signal of voltage divider 20 and the differential signal at the output of rectifier 25 are the same, as indicated by the intersection of the two curves in diagram 17 of FIG. 5, a signal appears at the output of comparator 17 which acts on timing element 18 and consequently supplies a switching signal according to diagram 18 in FIG. 5 at output 28.

The reference number of the particular component at whose output is applied the particular output voltage or the particular output current appears in each case behind the individual diagrams in FIG. 5.

The leading edges of the pulses of diagram 18 in FIG. 5 precisely correspond to the switching point and are decisive for further signal processing. The pulse duration of the signal is determined by timing elements 18, but is not important from the precision standpoint.

Figure 6:
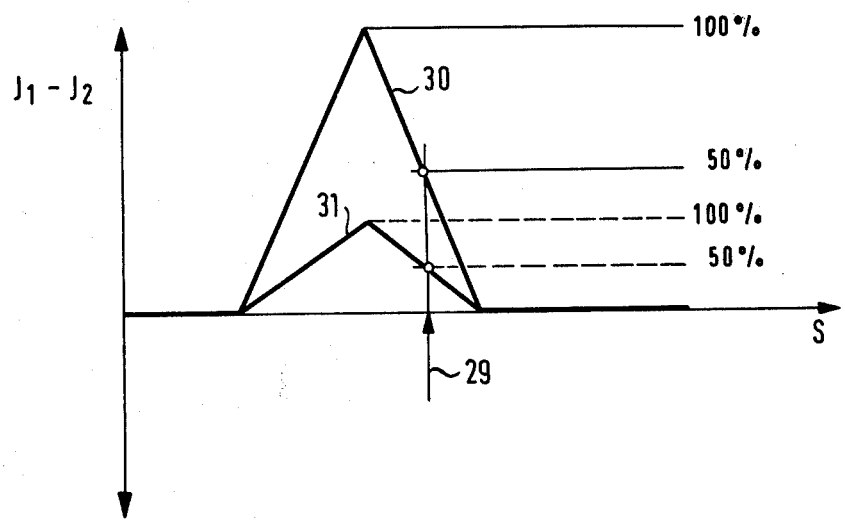
FIG. 6 a further diagram showing the contrast difference as a function of the contrast jump path for two different contrasts and their influence on the switching signal.

The advantageous characteristics of the method and switching arrangement according to the invention are now explained relative to FIG. 6:

FIG. 6 shows the differential signal at the output of differential amplifier 13 or rectifier 25, as a function of location S of the contrast jump for two different contrasts. Diagram 30 corresponds to a high contrast and diagram 31 to a low contrast. In both cases, the maximum value of the difference (100%) serves as a reference quantity for determining the switching point location 29. In the example of FIG. 6, it is assumed that the fraction of the maximum value formed at the voltage divider 20 is 50%, which means that a switching signal is emitted at output 28 as soon as the particular differential signal 30 or 31 has dropped from 100 to 50%. This means that, due to the linearity of the edges of the curve of the differential signal in both cases the 50% value is reached at the same location 29. It is clear that this also applies to random other contrast difference curves, provided that they are fundamentally the same as the curves 30, 31 of FIG. 6. Thus, it is essential that the maximum value is obtained precisely at the dividing line 26 between the two photodetectors 11, 12 and that from this point the differential signal drops linearly to zero.

Independently of the reflection characteristics of mark 23 or substrate 24 the signal is always emitted at the same penetration depth of the contrast jump into the following photodetector 12, because for each printing mark or for each contrast difference, the contrast is measured prior to the formation of the signal and the switching threshold is correspondingly adjusted.

The invention is not limited to the embodiments described and represented hereinbefore and various modifications can be made thereto without passing beyond the scope of the invention.

What is claimed is:

1. Method for producing a switching signal for determining the position of a boundary of a zone which contrasts with its background, the production of said switching signal being substantially independent of the intensity of the contrast, the method comprising the steps of:
   (a) producing relative movement between light from the contrasting zone and a photoelectric detector device comprising first and second photoelectric receivers disposed in series in the direction of relative movement;
   (b) generating first and second light intensity responsive signals with the receivers;
   (c) forming the instantaneous difference of the light responsive signals derived from the photoelectric receivers;
   (d) determining a value corresponding the maximum value of the difference;
   (e) deriving a fractional value equal to a fraction of the maximum value;
   (f) comparing the instantaneous difference with the fractional value corresponding to the boundary of the zone passing the second detector, and
   (g) generating the switching signal when the instantaneous difference equals the fractional value.

2. A method according to claim 1 wherein the fraction lies in the range of from about 30% to about 70% of the maximum value.

3. A method according to claim 2 wherein the fraction comprises about 50% of the maximum value.

4. A method according to claim 1 and comprising the further step of inhibiting the production of a switching signal until the maximum value exceeds a predetermined threshold.

5. A method according to claim 1 and comprising the further step of continuing the duration of the switching signal for a predetermined time.

6. A method according to claim 1 adapted for determining the position of two boundaries of a zone each contrasting with its background, the method comprising the further steps of forming a second switching signal corresponding to a second boundary passing the second detector and processing the first and second switching signals to determine the distance between the two boundaries.

7. Apparatus for producing a switching signal to determine the position of a relatively moving boundary of a zone which contrasts with its background, the apparatus being operable substantially independently of the intensity of the contrast and comprising: first and second photoelectric receivers disposed in series in the direction of relative movement, means for forming the instantaneous difference value of electrical output signals derived from the photoelectric receivers, means for determining a value corresponding to the maximum value of the difference value, means for deriving a fractional value equal to a fraction of the maximum value, a comparator for comparing the instantaneous difference value with the fractional value, and means for generating a switching signal when the instantaneous difference value equals the fractional value.

8. Apparatus according to claim 7 including a timing element coupled with the comparator for determining the duration of the switching signal.

9. Apparatus according to claim 7 wherein the means for determining a value corresponding to the maximum value of the difference comprises a store for storing the maximum value of the instantaneous difference value, and gating means for inhibiting the operation of the store until the instantaneous difference value has exceeded a threshold value.

10. Apparatus according to claim 9 wherein the means for deriving a fractional value comprises a potential divider connected across the output of the maximum value store.

11. Apparatus according to claim 7 wherein the photoelectric receivers comprise a difference photoelectric cell.

12. Apparatus according to claim 7 including an aperture plate placed in front of the photoelectric receivers.

13. Apparatus according to claim 7 wherein the means for forming the difference value comprises a differential amplifier, and including for each photoelectric receiver a current voltage transformer, the outputs of the current voltage transformers being connected to the differential amplifier.

14. Apparatus according to claim 7 further adapted to determine a second boundary of said zone, the apparatus further including means for processing the output signals to determine the extent of said zone.

15. Apparatus according to claim 14 including a rectifier connected between the means for forming the instantaneous difference value and the means for determining the maximum value of the difference.

16. A method for detecting the passage past a detection station of a boundary of a marking carried on a substrate which moves relative to the station, the marking having an optical appearance which contrasts with that of the substrate, the method comprising the steps of:

(a) generating a first light responsive signal of an area past which the substrate and the mark move upstream of and contiguous with the detection station;

(b) generating a second, light responsive signal of an area over which the substrate and the mark move immediately downstream of, contiguous with the detection station, and in alignment with the first mentioned area in the direction of movement of the web;

(c) generating a difference signal of the first and second light responsive signals;

(d) storing a maximum value of the difference signal;

(e) forming a reference signal from the stored maximum value which is a predetermined fraction of the maximum value;

(f) comparing the difference signal with the reference signal to detect when the two are equal; and (g) generating an output signal when the comparing step detects that the reference signal and the difference signal are equal;

whereby the reference signal is based on the relative contrast intensities of the marking and the substrate which is independent of their absolute contrast intensities and the output signal is generated whenever the boundary has passed the detection station by a predetermined amount which is a direct function of the fractional value of the reference signal relative to the stored maximum value of difference signal.

17. A method according to claim 16 wherein the marking has a predetermined length in the direction of movement of the web, wherein steps (a) and (b) include the steps of providing first and second photoelectric receivers which are disposed upstream and downstream of the detection station and which have respective edges contiguous with the detection station, and further including the step of limiting the field of view of the photoelectric receivers in the direction of movement of the web to less than the length of th marking.

18. A method according to claim 16 including the step of preventing the completion of step (g) so long as the stored maximum value of the difference signal falls below a predetermined threshold value.

19. A method according to claim 16 wherein steps (a) and (b), respectively, sequentially generate light responsive signals of the substrate and of the marking; the method further including the steps of repeating steps (a) and (b), respectively, to generate a second set of light responsive signals of the intensity of the mark and the substrate, respectively, and repeating steps (c)–(g) with the second set of light responsive signals so as to generate a second output signal, the time interval between the first mentioned output signal and the second output signal being a measurement of the length of the mark.

* * * * *